United States Patent [19]

Crissy et al.

[11] 4,392,762
[45] Jul. 12, 1983

[54] LOCKING WEB FITTING WITH SWIVEL

[75] Inventors: Charles F. Crissy; Paul M. Holmes, both of Jackson, Mich.

[73] Assignee: Aeroquip Corporation, Jackson, Mich.

[21] Appl. No.: 264,028

[22] Filed: May 15, 1981

[51] Int. Cl.$^3$ .......................... A44B 21/00; B60P 7/06; B61D 45/00

[52] U.S. Cl. ................ 410/116; 24/68 CD; 24/201 A; 24/265 CD; 248/222.2; 410/101

[58] Field of Search .......... 24/68 CD, 201 A, 265 R, 24/265 CD; 410/96, 101, 116; 248/222.2

[56] References Cited

U.S. PATENT DOCUMENTS

| | | | |
|---|---|---|---|
| 2,984,885 | 5/1961 | Elsner | 410/116 |
| 3,017,679 | 1/1962 | Elsner | 410/116 |
| 3,404,438 | 10/1968 | Goldman | 24/201 A |
| 3,429,537 | 2/1969 | Jantzen | 24/265 CD X |
| 4,065,833 | 1/1978 | Bender | 24/201 A |

*Primary Examiner*—Bruce H. Stoner, Jr.
*Assistant Examiner*—Howard Beltran
*Attorney, Agent, or Firm*—Beaman & Beaman

[57] ABSTRACT

The invention pertains to a releasable fitting for anchoring webs such as used in cargo control systems, the fitting including two side plates having a keeper plate located therebetween, and the plates each including an opening through which a web loop is passed. An anchor supports the side plates, and may also support the keeper plate, and is pivotally related to the plates wherein the plates may swivel with respect to the anchor to permit alignment of the plates with the web tension force or may swivel to a non-protruding position to protect the web. The anchor includes projections for selective locking reception within a support member opening, and latch tabs defined upon the side and keeper plates are located within the support member opening to prevent accidental release of the anchor therefrom at all pivotal positions of the plates.

8 Claims, 13 Drawing Figures

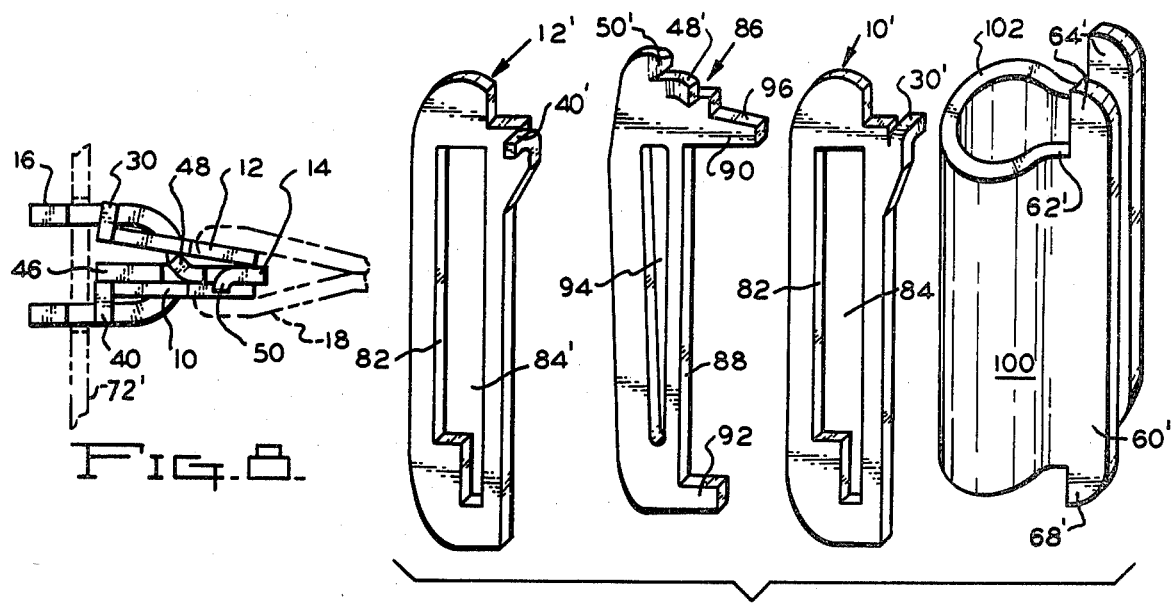
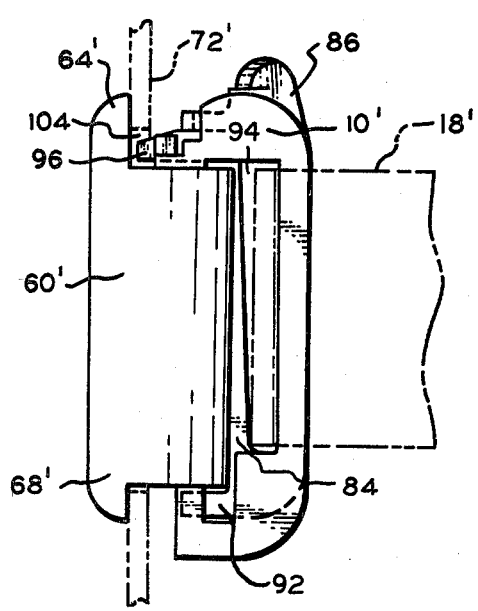
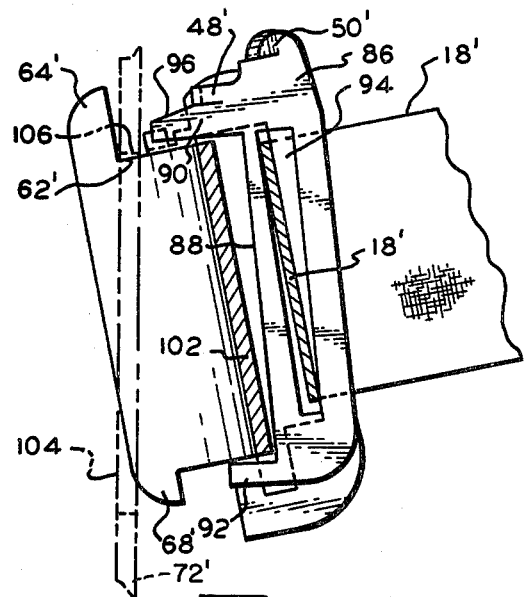
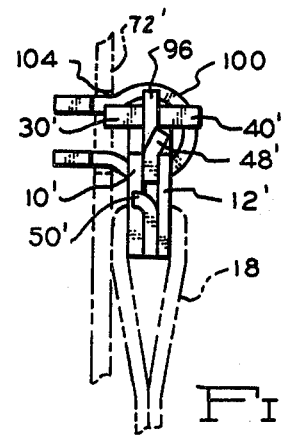
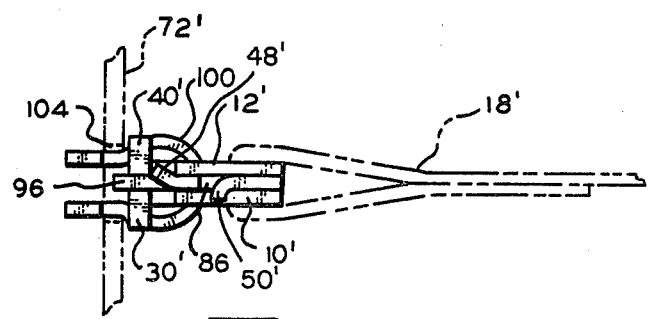

LOCKING WEB FITTING WITH SWIVEL

BACKGROUND OF THE INVENTION

Web straps are commonly employed in cargo control systems for positioning cargo within a compartment, reinforcing material handling apparatus, or similar applications. Such cargo control systems commonly employ means for tensioning the web, and the ends of the web straps are provided with anchors for attaching the web loop end to support structure, usually a track or fittings defined in the side wall, floor or ceiling of a cargo compartment.

One type of web fitting developed by the assignee is shown in U.S. Pat. Nos. 2,984,885 and 3,017,679 wherein two side plates with a keeper plate located therebetween are mounted upon a web strap and the side plates include notches of different depth whereby the side plate notches may be inserted within an opening defined in a support member. The center keeper plate includes a latch tab which is capable of aligning with the side plate notches to interfere with removal of the side plates from the opening to prevent inadvertent release, and the keeper plate also includes a web receiving opening of greater width than that of the side plates whereby the keeper plate may be displaced to remove its latch tab from alignment with the side plate notches, and permit release of the fitting from the support member opening by a combination vertical and tilting movement of the fitting.

While the releasable fitting described above, and shown in the aforementioned patents, provides an economical manner to attach a web strap to a fixed location the orientation of the fitting to the support member is relatively fixed due to the interrelationship of the support member opening with the side plate notches. Accordingly, the fitting is unable to adapt itself to the direction of tension within the web, and web tension which is lateral to the plane of the fitting plates will produce lateral forces upon the plates, and possibly cause plate bending. Further, the inability of the fitting to move relative to the support member may cause the web loop to be crushed against the fitting outer edges by adjacent cargo or material handling apparatus loosely transported within a cargo compartment, and it is not uncommon for webbing to be damaged by being pinched against its fitting.

It is an object of the invention to provide an economical attachment fitting for webs utilizing a plurality of plates through which a web loop extends wherein the plates are articulated with respect to an anchor permitting swiveling of the plates relative to the anchor causing the fitting to align itself with the web tension or fold flat against the support member and thereby aid in protecting the webbing against damage by pinching.

A further object of the invention is to provide a releasable attachment fitting for webbing wherein three plates mounted upon a web loop are associated with an anchor in an articulated manner wherein the plates may swivel with respect to the anchor, and the plates include latching tabs defined thereon which are selectively disposed in a predetermined relationship to mounting surfaces defined upon the anchor such that the latching tabs will prevent accidental release of the anchor from its support member regardless of the position of the fitting plates relative to the anchor.

An additional object of the invention is to provide an attachment fitting for webbing wherein side and keeper plates are mounted upon a web loop, the keeper plate being displaceable with respect to the side plates and including a latching tab, and the side plates being loosely mounted upon a U shaped anchor for articulation thereto. The anchor includes locking projections for association with the opening of the support member, and the side plates include latching tabs, said latching tabs of said side and keeper plates selectively cooperating with the anchor locking projections in a predetermined manner to prevent inadvertent release of the anchor from the support member opening.

A further object of the invention is to provide a releasable attachment fitting for webbing wherein three plates mounted upon the webbing are associated with a U shaped anchor, and a keeper plate includes a recess for providing clearance with the anchor to permit use of the fitting with large dimensional anchor receiving openings in a support member.

In the practice of the invention the fitting includes two relatively flat side plates mounted upon opposite sides of a keeper plate, and the plates are supported relative to a U shaped anchor in an articulated manner wherein the plates, and associated webbing, can pivot with respect to the anchor. Each of the plates includes a web receiving opening through which a web extends defining a loop at the webbing end, and the web receiving opening of the keeper plate is greater than that of the side plates whereby a displacement of the keeper plate generally parallel to the plane of the side plates is possible.

The U shaped anchor, in one embodiment, is received within the web receiving openings of all three plates, and in another embodiment, is received within the web receiving openings only of the side plates and an anchor clearance is defined in the keeper plate. The anchor includes two sets of locking projections which are adapted to be inserted through the opening of a support member, such as a track, and the length of one set of projections is greater than that of the other. Upon tilting of the anchor to insert the longer set of projections into the opening the anchor may be displaced by sequential linear and tilting movement to insert both sets of projections into the support member opening, and the anchor is "locked" within the opening by latch tabs defined upon the side and keeper plates.

The side plates are each provided with a latch tab which transversely extends to the general plane of the associated plate in an outward direction, and is located adjacent an inner edge of the associated plate so as to lie within the plane of the opening of the support member in which the anchor is located. Likewise, the keeper plate includes a latch tab generally defined within the plane of the keeper plate which also extends into the support member opening receiving the anchor. The latch tabs of the side and keeper plates are all located adjacent each other within the support member opening, and the orientation of the latch tabs will insure that at least one tab is located in alignment with the plane of the support member opening regardless of the pivotal relationship between the plates and the anchor. To remove the anchor from the support member opening the fitting must be oriented such that the plane of the keeper plate is substantially perpendicularly disposed to the plane of the opening wherein only the keeper plate latch tab is located within the opening plane. The keeper plate may then be displaced between the side plates, upon loosening of the web loop to permit the keeper plate abutment to slide past inner edges of the side plates, and such displacement of the keeper plate removes its latch tab from the opening permitting the anchor to be raised, tilted and withdrawn from the opening.

The articulation of the plates of the fitting which engage the webbing with respect to the anchor minimizes the stressing of the webbing in that the plates will automatically align themselves with the tension within the web, and as the plates can fold back against the support member when no web tension is present the likelihood of crushing or pinching the web is reduced as compared with the prior art fittings of this general type.

BRIEF DESCRIPTION OF THE DRAWINGS

The aforementioned objects and advantages of the invention will be appreciated from the following description and accompanying drawings wherein:

FIG. 8 is a top plan view of the fitting illustrating the relationship of the components upon displacing of the keeper plate to a release condition, FIG. 9 is an exploded perspective elevational view of another embodiment of web fitting in accord with the invention for use with larger dimension webs and support member openings than the fitting of FIGS. 1–8, FIG. 10 is a side elevational view of the assembled fitting of FIG. 9, FIG. 11 is a side elevational view of the fitting of FIG. 10 with the near side plate removed illustrating the relationship of the keeper plate, anchor and web during assembly or disassembly of the fitting to a support member, FIG. 12 is a top plan view of the fitting of FIG. 10 illustrating the plates disposed parallel to the support member, and FIG. 13 is a top plan view of the fitting of FIG. 10 illustrating the plates perpendicularly disposed to the support member.

DESCRIPTION OF THE PREFERRED EMBODIMENT

The embodiment of an articulated or swiveled web fitting shown in FIGS. 1–8 is particularly suitable for use with support members, such as tracks or the like, having an opening locking dimension of a smaller size, such as approximately $1\frac{1}{2}''$. The web fitting embodiment shown in FIGS. 9–13 is particularly suitable for use with openings defined in support members having a greater locking dimension, such as in the neighborhood of $2\frac{1}{2}''$, and the basic distinctions between the two embodiments occur within the configuration of the central keeper plate, as later described.

Figure 1:
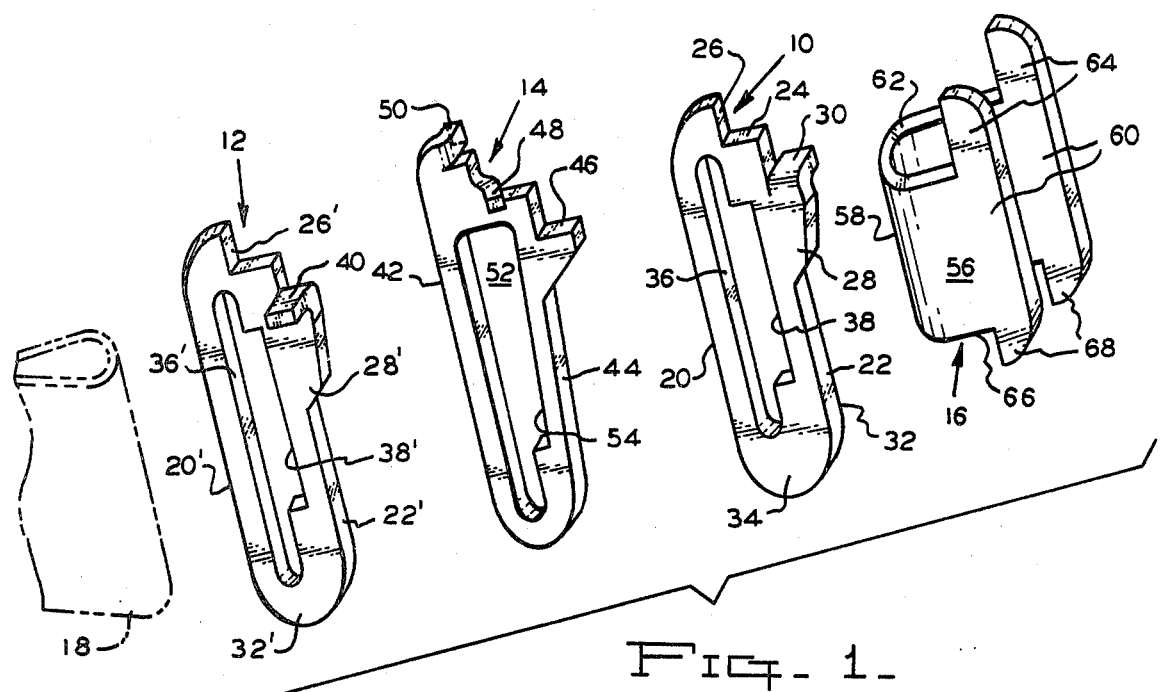
FIG. 1 is an exploded perspective view illustrating a web fitting in accord with the invention.

With reference to FIGS. 1–8, the basic components of the web fitting are illustrated in FIG. 1 wherein the right side plate is indicated at 10, the left side plate is indicated at 12, the keeper plate at 14, the anchor at 16, and the web is shown at 18, forming a loop. These components are assembled in a manner later described, and best illustrated in FIGS. 5–8.

The side plates 10 and 12, and the keeper plate 14 are formed of flat steel plate, and may be of a stamped fabrication. The side plates 10 and 12 are identical except with respect to the direction of extension of the locking tab, and identical components in side plate 12 are identified by primed reference numerals corresponding to those described with respect to plate 10. The planar plate 10 includes an outer edge 20, and an inner edge 22, and at one end the side plate is stepped to form surface 24, and shoulder surface 26 which extends in the general length of the side plate. At the inner edge an inwardly extending portion 28 includes the latch tab 30 which extends beyond the outer side 32 of the plate, and the plate inner side 34 is of a planar form free of any protrusion or extension. A web receiving opening 36 is defined within the side plate having a length parallel to the plate length, and this opening includes an anchor receiving notch 38 of lesser longitudinal dimension.

Figures 2, 3, 4:
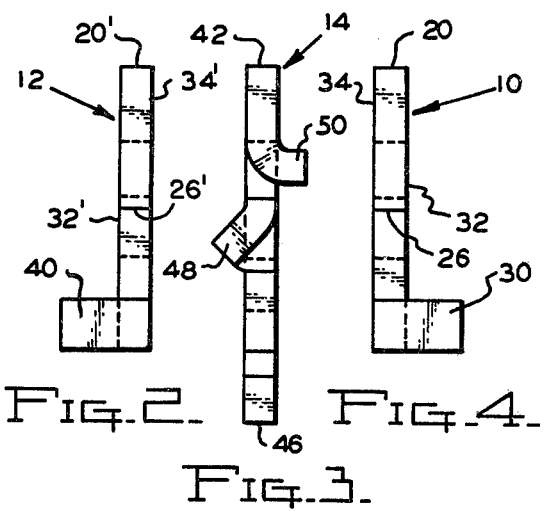
FIG. 2 is a top plan view of the left side plate.
FIG. 3 is a top plan view of the keeper plate.
FIG. 4 is a top plan view of the right side plate.

The left side plate 12 is identical to plate 10, except that the latch tab 40 extends to the left, FIGS. 1 and 2, beyond the outer side 32' of the side plate.

The keeper plate 14 is also of an elongated configuration including an outer edge 42, and an inner edge 44. The inner edge includes the latch tab 46 which extends beyond the general configuration of the inner edge, and at its upper region an obliquely disposed tang 48 extends from the plane of the plate 14 to the left, FIG. 1, and at its uppermost region an offset abutment 50 extends from beyond the configuration of the right side of the keeper plate. A web receiving opening 52 is defined within the keeper plate 14, and the opening also includes the anchor receiving notch 54. As will be appreciated from FIG. 1, the width of the opening 52 is greater at its upper portion adjacent the tang 48, than at the lower region whereby upon a web being received within the opening the keeper plate is capable of being shifted relative to the web in the direction of the keeper plate plane.

The anchor 56 is of a generally U shaped configuration formed of steel and includes an arcuate convex base 58 interconnected by substantially parallel leg portions 60. The leg portions each include an edge 62 from which a first set of locking projections 64 extend and an edge 66 from which a second set of locking projections 68 extend. The length of the projections 64 is greater than the length of projections 68.

Figure 5:
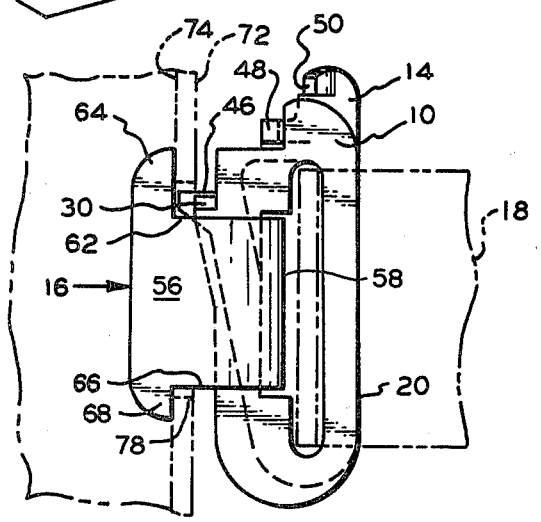
FIG. 5 is an elevational view of the assembled fitting as attached to the support member, the support member and web being shown in phantom lines.
Figure 6:
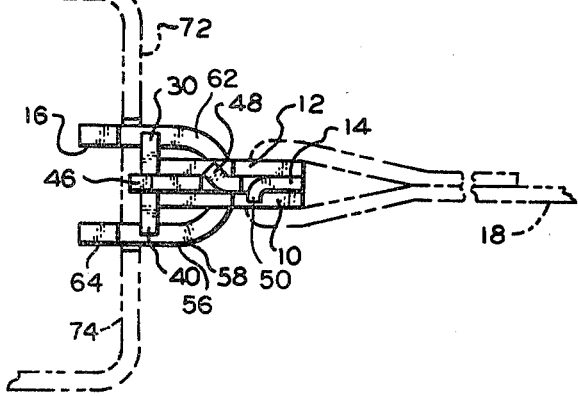
FIGS. 6 and 7 are top plan views illustrating the assembled fitting as attached to a support member wherein the plates are perpendicularly and angularly disposed, respectively, to the support member opening.
Figure 7:
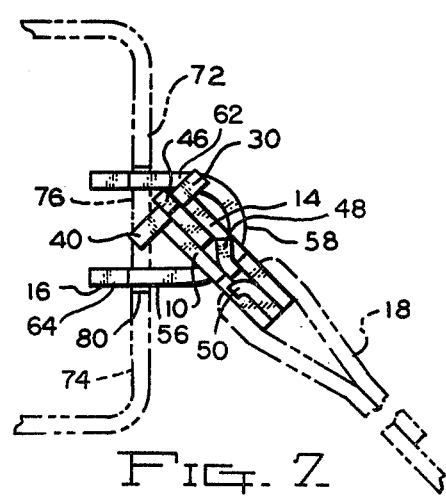

To assemble the fitting of FIG. 1 the projections 64 and leg portions of the anchor 56 are inserted through the web receiving openings of the side plates 10 and 12 and keeper plate 14. The keeper plate 14 is located intermediate the side plates 10 and 12 whereby the inner surfaces 34 will engage the keeper plate when the side and keeper plates are in parallel operative position as shown in FIGS. 5–7. The side plate notches 38 and 38', and the keeper plate notch 54, are of such dimension as to readily receive the base 58 of the anchor, and the insertion of the web 18 through the web openings 36, 36' and 52 completes the assembly. The web 18, which may be formed of woven nylon or other high strength fabric, is folded back upon itself, and sewn, to define a loop upon which the side plates are rather loosely mounted, and as the side and keeper plates are also loosely mounted upon the anchor base 58 an articulated or swivel relationship exists between the plates and the anchor.

The relationship of the latch tabs 30 and 40 to the web receiving openings of the associated side plates 10 and 12 and the relationship of the latch tab 46 to the web receiving opening of the keeper plate 14 is such that the upper surface of the three latch tabs are in substantial alignment when the fitting is assembled, as will be appreciated from FIG. 5. This alignment occurs above the anchor edge 62 adjacent the longer projections 64, and the dimension of this alignment of the latch tabs above the associated anchor edge 62 is related to the length of the latch projections 68 and the locking dimension of the support member opening such that the anchor may be located within its support member opening.

In FIGS. 5–8 the support member 70 is represented in phantom lines and may consist of a post, track, or other metal component, and the support member includes a flat panel 72, usually vertically oriented, having an inner side 74. The panel 72 includes a rectangular opening 76 defined therein having a locking dimension defined by the spacing of the edges 78, FIG. 5, and the width of the opening is defined by the edges 80, FIG. 7. The spacing between opening edges 78 is greater than the spacing between the anchor edges 62 and 66, and less than the maximum height of the anchor as defined by the ends of the projections 64 and 68 defined upon a common anchor leg portion. The spacing between the opening edges 80 is greater than the maximum spacing between the anchor leg portions 60, as appreciated from FIGS. 6 and 7.

To insert the anchor 16 into the opening 76 the web loop is loosened, and the operator grips the keeper plate abutment 50 to slide the keeper plate relative to the side plates 10 and 12 in a direction toward the plates' outer edges 20 and 20'. The oblique tang 48 will engage the edge 26' of the left side plate 12 and "spread" the side plates, and the latch tab 46 will be shifted to the position shown in FIG. 8 wherein it is in substantial alignment with the latch tabs 30 and 40. Thereupon, the anchor projections 64 may be inserted under the upper opening edge 78 by tilting the anchor 56, such as shown in FIG. 11, and once the projections 64 are within the opening 78, and held against the inner surface 74, the anchor may be moved upwardly until the lower portion of the anchor, and projections 68, pass over the lower opening edge 78 to permit the anchor portions 64 and 68 to be fully received within the opening 76 as shown in FIG. 5.

The aforementioned assembly procedure is substantially identical to that shown in the assignee's U.S. Pat. No. 2,984,885, although the patent does not disclose an anchor.

With the anchor fully received within the opening 76 the keeper plate 14, which is held "open" by the abutment 50 engaging outer edge 42, is then pushed toward the support member 70 removing the abutment 50 from engagement with the outer edge of the keeper plate and removing tang 48 from engagement with side 34' of plate 12, and permitting the side and keeper plates to engage in parallel relationship, as shown in FIG. 6. In this relationship, the latch tab 46 of the keeper plate will be located within the opening 76, FIGS. 5 and 6, and the latch tab 46 will prevent the anchor 56 from being moved upwardly sufficiently to permit the projections 68 to pass over the lower opening edge 78. Thus, the fitting will be locked within the opening 76 when the side and keeper plates are in the operative position of FIGS. 5 and 6 wherein the plates are substantially perpendicular to the panel 72.

The mounting of the plates 10, 12 and 14 upon the anchor 56 permits the plates to freely swivel upon the anchor base 58 and the plane of the plates will align themselves with the direction of tension force within the web 18. Thus, if the web is pulled in the oblique direction shown in FIG. 7 the plates 10, 12 and 14 will pivot with respect to the anchor as shown, and such pivoting will locate the latch tab 40 of side plate 12 within the opening 76, preventing the anchor from moving from the opening in an upward direction. Conversely, if the plates are oriented "upwardly", FIG. 7, the latch tab 30 will be located within opening 76. Accordingly, regardless of the "angle" of the side and keeper plates relative to the support member panel 72 at least one of the latch tabs 30, 40 or 46 will always be located within the opening 76, and on occasion portions of two latch tabs will be so located, and the latch tabs will effectively lock the anchor, and fitting, with respect to the support member 70.

To remove, as to install, the fitting from the opening 76 it is necessary to align the plates 10, 12 and 14 with respect to the support panel 72 in a substantially perpendicular manner, as shown in FIGS. 6 and 8, and the keeper plate abutment 50 is grasped after the tension has been removed from the web loop, and the keeper plate is moved toward the right, the side plates will be spread as shown in FIG. 8, and the keeper latch tab 46 will be withdrawn from the opening 76 permitting the anchor 56 to be lifted until the upper edge 62 engages the anchor upper edge 78, thereupon the projections 68 may be pivoted from the opening, and the anchor tilted and withdrawn from the opening, such as in FIG. 11.

In use, the tension within the web loop 18 will maintain the side and keeper plates in parallel engaged relationship, and displacement of the keeper plate to the right, FIG. 6, is prevented by engagement of the tang 48 with the side plate edge 26'. Thus, the keeper plate 14 cannot be shifted to a fitting removal or installation position until the tension within the web loop is removed.

The ability of the articulated fitting to permit the plates 10, 12 and 14 to swivel or pivot relative to the anchor 56 permits the plates to automatically orient themselves in the direction of the web tension. Further, the fact that the plates are capable of swiveling to a position adjacent the panel 72, particularly when web tension is removed, minimizes the likelihood of the web looping being crushed against the side and keeper plate outer edges, or sides, by shifting cargo or the like.

As previously stated, the articulated web fitting embodiment of FIGS. 9–13 is quite similar to that of FIGS. 1–8 except that the locking dimension of the opening within the support member is significantly greater, and this dimensional difference requires modifications in the keeper plate construction in order to facilitate assembly, and provide the desired operational characteristics. In the embodiment of FIGS. 9–13 primed reference numerals are used for elements and components similar to those previously described.

The side plates 10' and 12' are identical in construction, and the plates 10' includes a latch tab 30' extending from the outer side thereof, while the side plate 12' includes the latch tab 40' extending from its outer side. The notch 82 defined in the web openings 84 and 84' is for the purpose of receiving the web, not shown in FIG. 9, and the vertical height of the anchor base in the embodiment of FIGS. 9–13, is greater than the vertical dimension of the web.

The keeper plate 86 includes an inner edge 88 which is in the form of a recess in that the upper portion 90 and the lower portion 92 extend beyond this inner edge. A separate web receiving opening 94 is defined in the keeper plate having a maximum width at its upper end to permit displacement, the minimum width being located at the lower region of the keeper plate. The keeper plate includes the latch tab 96 defined on portion 90, the offset tang 48', and the abutment 50' for facilitating operation of the keeper plate.

In the embodiment of FIGS. 9-13 the anchor 100 is of a slightly modified form with respect to the anchor 56 previously described in that the arcuate base portion 102 is somewhat horseshoe shaped, rather than the arcuate base being tangential to the leg portions, and only the side plates 10' and 12' are mounted upon the anchor base portion 102 by their web receiving openings 84 and 84'.

The fitting of FIGS. 9-13 is assembled by inserting the projections 64' and leg portions 60' of the anchor 100 through the web receiving openings 84 and 84' of the side plates 10' and 12'. Thereupon, a web 18' is inserted through the openings 84 and 84', and the keeper plate opening 94 to form the web loop. Thus assembled, the keeper portion 90 will extend above the anchor base 102, while the keeper portion 92 will extend below the anchor base, but the keeper plate will not be directly attached to the anchor, as is the case with the previously described embodiment.

FIG. 10 is an elevational view of the assembled fitting of FIG. 9 illustrating the relationship of the components in the operative position of FIG. 13. In this relationship the plates 10', 12' and 86 will be substantially perpendicularly disposed to the plane of the support member panel 72', and the keeper plate latch tab 96 will be located within the opening 104 to prevent the anchor from being moved upwardly within the opening, and released therefrom.

In FIG. 11 the side plate 10' has been removed for purpose of illustration and indicates the relationship of the keeper plate edge 88 and web opening 94 to the web and anchor upon the keeper plate 86 being shifted to the right with respect to the side plates for installing or removing the anchor relative to the opening 104. As is the case with the previously described embodiment, displacement of the keeper plate latch tab 96 to the right permits the upper anchor projections 64' of greatest dimension to be inserted within the opening 104, and the anchor raised as shown in FIG. 11 wherein the upper edge 106 of the opening engages the anchor edge 62' permitting the lower projections 68' to clear the opening lower edge upon being tilted inwardly, or to the left as viewed in FIG. 11. After installation of the anchor 100 the keeper plate 86 is shifted to the left to establish the relationship of FIGS. 10 and 13.

In FIG. 12 the web fitting is shown as swiveled to dispose the side and keeper plates substantially parallel to the panel 72', and in this relationship the latch tab 30' will be disposed within the opening 104 to prevent the anchor 100 from being raised with respect to the opening and removed therefrom.

The fact that the recess defined by edge 88 loosely receives the anchor base permits the keeper plate 86 to function as desired, and the configuration of the keeper plate web opening 94 permits the keeper plate to be displaced to the unlocking position without the web creating undue resistance. Further, the fact that the web maintains the assembly of the plates 10, 12 and 14, and 10', 12' and 86, eliminates the need for second operations, such as staking or bending of the anchor, and the articulation of the anchor aids in improving the load distribution on the support member 70.

It is appreciated that various modifications to the inventive concepts may be apparent to those skilled in the art without departing from the spirit and scope of the invention.

We claim:

1. A releasable fitting for web straps wherein the fitting is mounted within an opening defined in a support member having a locking dimension and a wall thickness comprising, in combination, a pair of substantially flat side plates each having a web receiving opening, an anchor receiving opening, an inner edge, an outer side and an inner side, a latch tab defined upon each side plate adjacent said inner edge thereof and transversely disposed to the plane of the associated side plate extending from said outer side thereof, a substantially flat keeper plate having a web receiving opening defined therein, an inner edge, and a third latch tab defined upon said keeper plate inner edge, said keeper plate having a wider web receiving opening than that of said side plates and being interposed between said side plates' inner sides, a web inserted through said web receiving openings of said side and keeper plates defining a loop, an abutment defined on said keeper plate extending from the plane thereof adapted to abut against a side plate inner edge when said side and keeper plates are in parallel engaged relationship, and a U shaped anchor having an arcuate base loosely extending through said side plates' anchor receiving openings whereby said side plates swivel thereon and are oriented to said anchor base in a predetermined manner, said arcuate base including leg portions each having first and second edges defined thereon extending transversely to the length of said base, a first projection defined upon each leg portion first edge extending therefrom and a second projection defined upon each leg portion second edge extending therefrom, said first and second projections defined upon a common leg portion being in substantial alignment and said first and second projections being in alignment, respectively, said first projections being of greater length than said second projections and the spacing between said first and second leg portion edges being less than the locking dimension of the support member opening whereby said first projections can be inserted into the opening by tilting the anchor, displacing the anchor in the direction of said first edges and then inserting said second projections into the opening, said side plates swiveling upon said anchor base and said latch tabs extending into the opening at all swivel positions of said plates preventing sufficient displacement of said anchor within the opening to remove said second projections therefrom, said wide keeper plate web receiving opening permitting displacement of said keeper plate to selectively remove said third latch tab from the opening permitting removal of said anchor therefrom.

2. In a releasable fitting for web straps as in claim 1 wherein said latch tabs defined upon said side plates comprise tabs defined of the material of the associated side plate.

3. In a releasable fitting for web straps as in claim 1 wherein said anchor receiving openings intersect said web receiving openings of said side plates.

4. In a releasable fitting for web straps as in claim 3 wherein said keeper plate includes a recess at its inner edge receiving said anchor base.

5. A releasable fitting for web straps comprising, in combination, a pair of side plates each having a web receiving opening, an anchor receiving opening, an inner edge, an outer side and an inner side, a latch tab defined upon each side plate adjacent said inner edge thereof extending from the associated outer side, a keeper plate having a web receiving opening defined therein, an inner edge, and a third latch tab defined upon said keeper plate inner edge, said keeper plate having a wider web receiving opening than that of said side plates and being disposed between said side plates' inner sides, a web inserted through said side and keeper plates web receiving openings defining a loop, an abutment defined upon said keeper plate extending from the plane thereof adapted to engage a side plate inner edge when said side and keeper plates are in parallel engaged relationship, and a U shaped anchor having leg portions interconnected by a convex base extending through said side plates' anchor receiving openings loosely supporting said side plates on said base in a predetermined manner whereby said plates swivel with respect to said anchor, said leg portions including aligned first and second sets of projections for affixing said anchor to a support member through an opening, said latch tabs being disposed adjacent each other and adjacent said first set of projections.

6. In a releasable fitting for web straps as in claim 5 wherein said latch tabs defined upon said side plates comprise tabs defined of the material of the associated side plate.

7. In a releasable fitting for web straps as in claim 5 wherein said anchor receiving openings intersect said web receiving openings of said side plates.

8. In a releasable fitting for web straps as in claim 7 wherein said keeper plate includes a recess at its inner edge receiving said anchor base.

* * * * *